United States Patent (12) United States Patent  
Satoh (10) Patent No.: US 6,731,779 B2  
(45) Date of Patent: May 4, 2004

(54) FINGERPRINT CERTIFYING DEVICE AND METHOD OF DISPLAYING EFFECTIVE DATA CAPTURE STATE

(75) Inventor: Masako Satoh, Yamagata (JP)

(73) Assignee: NEC Corporation, Tokyo (JP)

( * ) Notice: Subject to any disclaimer, the term of this patent is extended or adjusted under 35 U.S.C. 154(b) by 616 days.

(21) Appl. No.: 09/727,501

(22) Filed: Dec. 4, 2000

(65) Prior Publication Data

US 2001/0002933 A1 Jun. 7, 2001

(30) Foreign Application Priority Data

Dec. 7, 1999 (JP) .......................................... 11-347738

(51) Int. Cl.$^7$ ................................................. G06K 9/00
(52) U.S. Cl. ...................................... 382/124; 382/173
(58) Field of Search ................................. 382/124, 115, 382/116, 125, 126, 127, 173, 177; 356/71; 340/5.53, 5.83; 235/379, 380, 382, 382.5; 341/51

(56) References Cited

U.S. PATENT DOCUMENTS 4,747,147 A * 5/1988 Sparrow ...................... 382/125  
5,239,590 A * 8/1993 Yamamoto .................. 382/125  
6,611,213 B1 * 8/2003 Bentley et al. ................ 341/51

FOREIGN PATENT DOCUMENTS

| JP | 6-28459 | 2/1994 |
| JP | 10-091784 | 4/1998 |
| JP | 2833314 | 10/1998 |
| JP | 11-197135 | 7/1999 |

OTHER PUBLICATIONS

Japanese Office Action with English translation of pertinent portions dated Feb. 4, 2003.

* cited by examiner

Primary Examiner—Samir Ahmed  
Assistant Examiner—Vikkram Bali  
(74) Attorney, Agent, or Firm—Whitham, Curtis, & Christofferson, PC (57) ABSTRACT

A fingerprint certifying device for an effective data capture state when a fingerprint is certified, including: a storage unit for storing a registered fingerprint image; a collating unit for collating a collating fingerprint image inputted to a fingerprint sensor with the registered fingerprint image divided into a predetermined number of blocks; a counter for counting up the number of effective blocks in which the registered fingerprint image of the predetermined number of blocks is coincident with the collating fingerprint image; and a display unit for displaying the value corresponding to a ratio of the count value of effective data to a predetermined block number.

6 Claims, 6 Drawing Sheets

FINGERPRINT CERTIFYING DEVICE AND METHOD OF DISPLAYING EFFECTIVE DATA CAPTURE STATE

BACKGROUND OF THE INVENTION

1. Field of the Invention

The present invention relates to a method of displaying an effective data capture state in a fingerprint certifying system and a fingerprint certifying device.

2. Description of the Related Art

A "fingerprint certifying system" is based on the fact that individual persons existing in the world have different fingerprint characteristics, and it electrically reads out the fingerprints of respective persons to specify persons which have been registered in advance.

At present, much attention has been paid to the problem of "security" in various fields. Particularly, most attention has been paid to the fingerprint certifying system among various methods of certifying the subject (i.e., a person in question is certified as a registered person) in an information security field because it is most effective and have highest certainty. According to a general fingerprint certifying system, the fingerprint face of a finger of a person is put on an input sensor for reading and identifying the fingerprint, and if the fingerprint thus read is coincident with the pattern of the fingerprint of a person who has been registered in advance, the person concerned is certified as the person registered (i.e., the subject).

Japanese Laid-open Patent Publication No. Hei-11-197135 discloses a fingerprint image input device and a fingerprint collating device for the fingerprint certifying system as described above. According to this publication, in order to fetch a high-reproducibility fingerprint image through a simple operation, a pair of electrodes are disposed as an element of a pulse oscillating circuit at a finger placing position, and the placing of a finger of a living body at the finger placing position is detected on the basis of the capacitance between the pair of electrodes by variation of the oscillation frequency, whereby an fingerprint image pickup operation is started upon the placing of the finger.

Further, Japanese Laid-open Patent Publication No. Hei-5-189547 discloses a fingerprint collating device. According to the fingerprint collating device of this publication, plural collating window images obtained by segmenting, in the form of windows, a registering fingerprint image which is revised through the directional filtering processing based on the direction data on the rising or sinking lines of the fingerprint which are obtained by dividing the registering fingerprint image into prescribed areas and extracting them respectively is collated with a collating target fingerprint image to certify the person in question. The fingerprint collating device is equipped with a register memory where the direction data extracted from the registering fingerprint image are registered and a revising means which divides the collating target fingerprint image having the same area as the registering fingerprint image into the prescribed areas and carries out the directional filter processing to each corresponding area based on the direction data registered in the register memory to revise the bridges and cracks of the fingerprint included in the collating target fingerprint image, whereby the collating target fingerprint image is revised by using the direction data extracted from the registering fingerprint image and the fingerprint are collated with each other.

Figure 1:
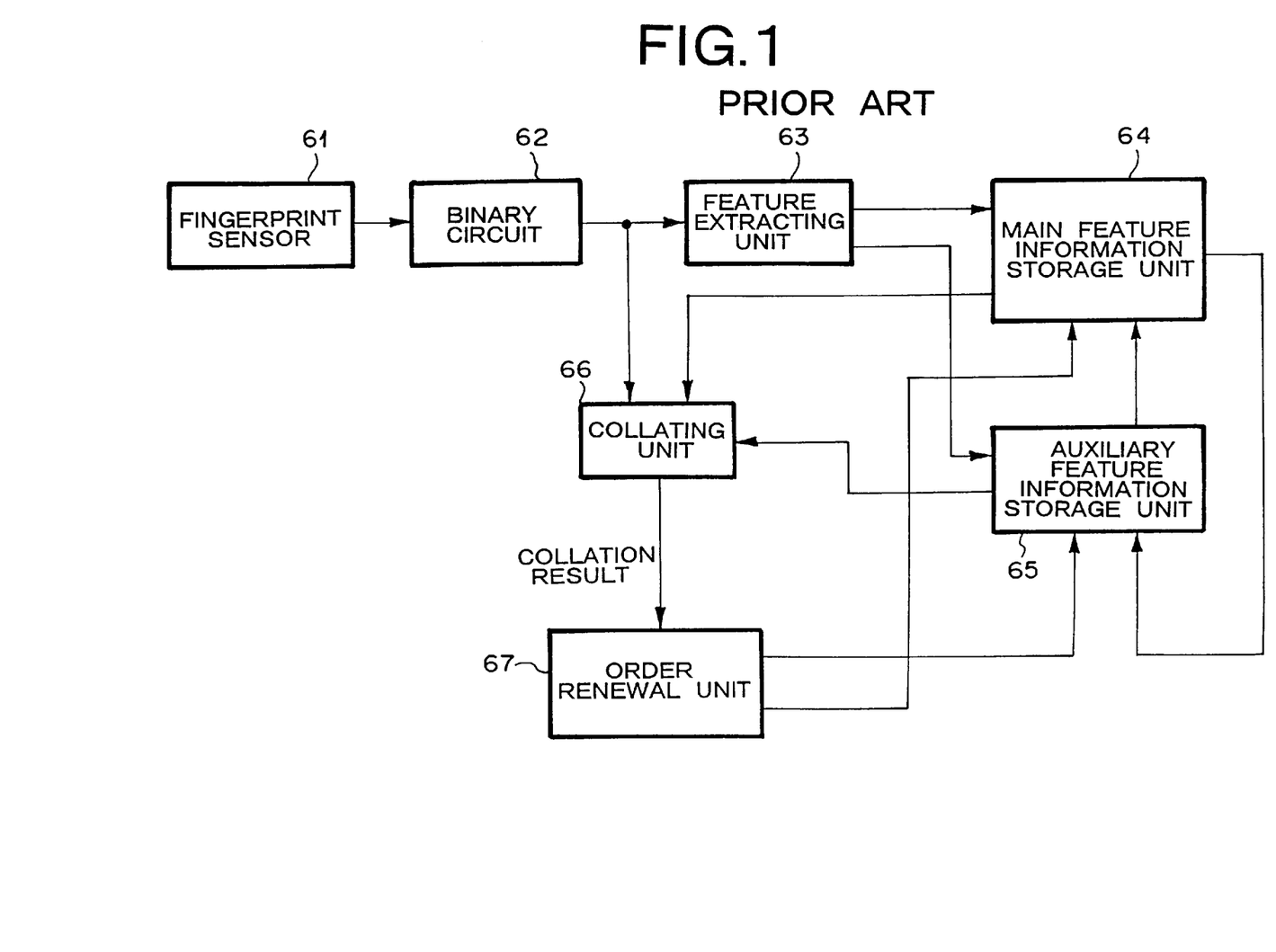
FIG. 1 is a diagram showing the construction of a conventional fingerprint certifying device.

Still further, Japanese Laid-open Patent Publication No. Hei-6-28459 discloses a fingerprint collating device for performing a pattern matching between an input fingerprint and a registered fingerprint dictionary to certify a person in question. FIG. 1 shows the construction of the fingerprint collating device disclosed in the above publication.

First, at the time when a dictionary is registered, a fingerprint image signal read out as an image pattern by fingerprint sensor 61 is converted to a digital signal by binary circuit 62, and a feature portion of the fingerprint image is extracted from the fingerprint image signal in feature extraction unit 63. Thereafter, a constant number of feature patterns (main feature patterns) required to certify that a person concerned is the subject are registered in main feature information-storage unit 64, and preliminary auxiliary feature patterns are registered in auxiliary feature information-storage unit 65. Collating unit 66 collates the input fingerprint image with the main feature patterns through the patterning matching at the time when the fingerprint is input. The pattern matching is carried out by judging coincidence or non-coincidence between a pattern read out from a window and dictionary patterns (main feature patterns) stored in the main feature information-storage unit 64 while successively scanning the input fingerprint image with a predetermined size of window. The collation result is stored in order renewal unit 67.

Subsequently, the certification of the person in question is carried out by judging whether the number of coincident patterns (the number of passing feature patterns) obtained through the fingerprint collation result is larger than a predetermined reference value. If the person in question is not certified, the fingerprint collation is carried out again.

If the person in question is certified, the residual auxiliary feature patterns stored in the auxiliary feature information-storage unit 65 are collated with the input fingerprint image, and the collation result is stored in the order renewal unit 67. The using order is renewed by using the pass/fail information of coincidence/non-coincidence stored in the order renewal unit 67. Since the collating operation is carried out on the next input fingerprint image in accordance with the using order, the collating speed is enhanced.

The Japanese Laid-open Patent Publication No. Hei-6-28459 discloses an example in which a timer is provided to the collating unit 66 shown in FIG. 1. The timer starts the counting of clocks from the time when the fingerprint dictionary is registered. When the timer count value reaches a predetermined value, a signal is transmitted from the timer to the order renewal unit 67. When receiving this signal, the order renewal unit 67 deletes unneeded feature patterns stored in the auxiliary feature information-storage unit 65. As a result, only the feature patterns, having high reliability, which are required to certify the person in question remain in the main feature information-storage unit 64 after a predetermined time elapses. Therefore, the collating speed for the subsequent collating operation can be enhanced.

According to the conventional system, however, a fixed amount of data (effective points) must be collected (fingerprint-captured) from a finger put on a fingerprint input sensor to recognize the fingerprint of the finger. Therefore, the conventional technique described above has the following disadvantages.

A first disadvantage resides in that the conventional technique mainly pays its attention to the improvements in the processing time of a fingerprint certifying device, a device having a construction enabling easy certification, etc. in terms of the device side, and thus a person being certified does not know how long it takes to reach the number of points (the number of effective points) enough to certify (recognize) that the person concerned is the subject from the time when the person puts his/her finger to certify/ascertain the fingerprint.

A second disadvantage resides in that the collation result is not informed to the person being certified unless the person concerned has been certified as the subject registered in advance.

SUMMARY OF THE INVENTION

An object of the present invention is to display the number of recognized points during the signal processing time period for ascertaining in the fingerprint certification process, thereby keeping the mind of a person being certified free out of anxiety during the ascertaining processing of the subject.

In order to attain the above object, according to an aspect of the present invention, a fingerprint certifying device comprising: a storage unit for storing a registered fingerprint image; a collating unit for collating a collating fingerprint image inputted to a fingerprint sensor with the registered fingerprint image divided into a predetermined number of blocks; a counter for counting the number of effective blocks in which the registered fingerprint image of the predetermined number of blocks is coincident with the collating fingerprint image; and a display unit for displaying the value corresponding to a ratio of the count value of the number of effective blocks to a predetermined block number.

According to a second aspect of the present invention, a method of displaying an effective data capture state when a fingerprint is certified, comprising the steps of storing registered fingerprint images in a storage unit; inputting the pattern of a fingerprint to a fingerprint sensor to read out a collating fingerprint image; collating the collating fingerprint image with the registered fingerprint image read out from said storage unit; counting the number of effective blocks in which the registered fingerprint image divided into the predetermined number of blocks is coincident with the collating fingerprint image; and displaying the ratio of m/n as the effective data and the residual value of 1−(m/n) as the residual data, when the total effective pixel number of the registered fingerprint image is equal to n and the number of the effective pixels corresponding to the effective block number counted up is equal to m wherein m and n represent positive integers.

According to a third aspect of the present invention, a fingerprint certifying device comprising: a storage unit for reading out a registered fingerprint image as a reference and storing the registered fingerprint image on a pixel basis; a fingerprint sensor for reading a finger to be certified as a collating fingerprint image; a collating unit for collating the collating fingerprint image input to said fingerprint sensor with the registered fingerprint image; a counter for counting up pixels which are collated to be coincident between the registered fingerprint image and the collating fingerprint image in said collating unit; and a display unit for displaying a display index in accordance with the count value of said counter, wherein a predetermined number of pixels to the total pixel number of the registered fingerprint image stored on a pixel basis is set as the maximum value of the display index, and the display index is displayed in accordance with the count value of the pixels which are coincident between the registered fingerprint image and the collating fingerprint image.

DETAILED DESCRIPTION OF THE PREFERRED EMBODIMENTS

Preferred embodiments according to the present invention will be described hereunder with reference to the accompanying drawings.

First Embodiment

Figure 2:
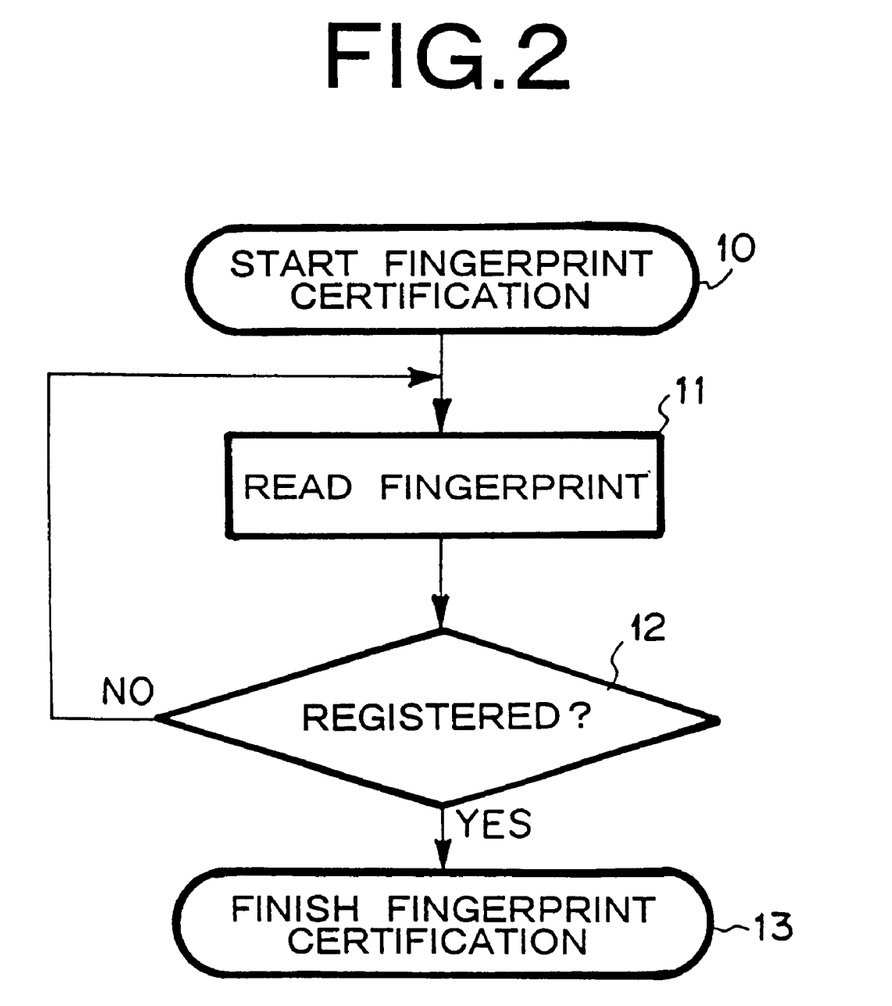
FIG. 2 is a flowchart showing the operation of a fingerprint certifying device according to the present invention.

FIG. 2 is a flowchart showing an embodiment of a system according to the present invention.

In FIG. 2, finger certification is first started (step 10). Subsequently, a fingerprint is read out (step 11), and it is judged whether the fingerprint thus read out exists in fingerprints which have been already registered (step 12). If the fingerprint thus read out does not exist in the registered fingerprints, the fingerprint concerned is read out again (step 11). If it is judged as one of the registered fingerprints, the fingerprint certification is finished (step 13). Here, when the fingerprint certification is initial, a fingerprint for registration is read out in advance and registered. Even when registered fingerprints exist, if one of registered fingerprints is not coincident with the fingerprint concerned, the steps 11 and 12 would be repeated endlessly.

Figure 4:
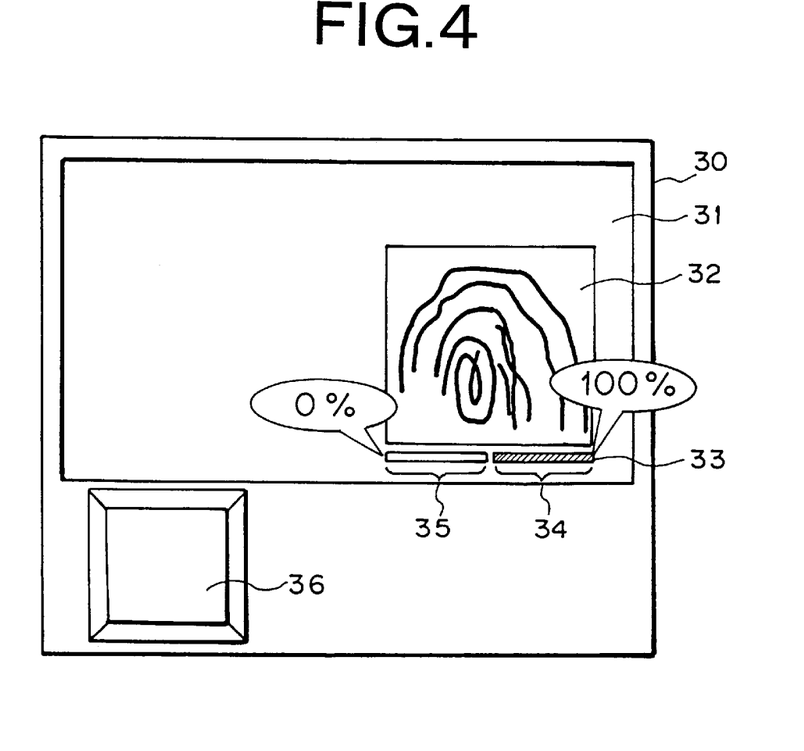
FIG. 4 is a diagram showing the outlook of the fingerprint certifying device according to the present invention.

FIG. 4 shows the outlook of a fingerprint certifying device. Fingerprint certifying device 30 has liquid crystal display (LCD) unit 31 and fingerprint input sensor unit 36 for certification. Pattern of fingerprint 32 is displayed on a part of the LCD unit 31 for certification. Also, indicator 33 is displayed on a part of the LCD unit 31. The indicator 33 indicates the number of certification points (hereinafter referred to as "certification point number") by using a percentage expression from 0% to 100%. Residual pointer 34 (the color is black) indicates the number of the residual points of the certification points in the indicator 33 and effective pointer 35 (the color is red) indicates the effective points of the certification points in the indicator 33.

Figure 5:
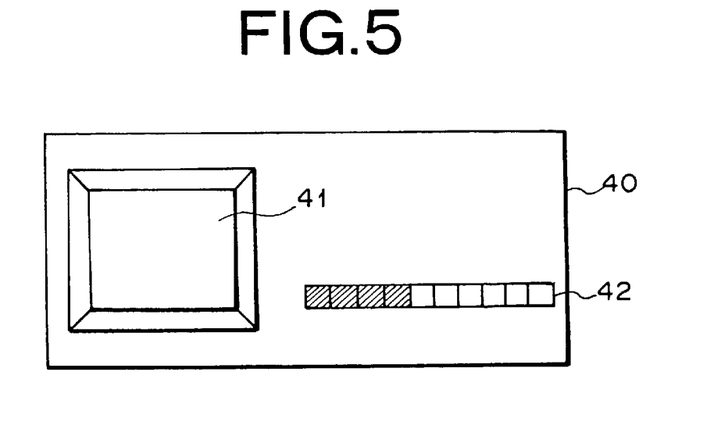
FIG. 5 is a diagram showing the outlook of the fingerprint certifying device according to the present invention.

FIG. 5 shows a modification of FIG. 4 in which the indicator is disposed at a different place from that of FIG. 4.

Fingerprint certifying device 40 provides fingerprint input sensor unit 41 and LED (Light Emitting Diode) indicator 42. The LED indicator 42 digitally indicates the time in which the effective point number is reached. The fingerprint certifying device 40 provides no LCD unit, and thus the fingerprint certifying device 40 can be reduced less in size than that of FIG. 4.

Figure 6:
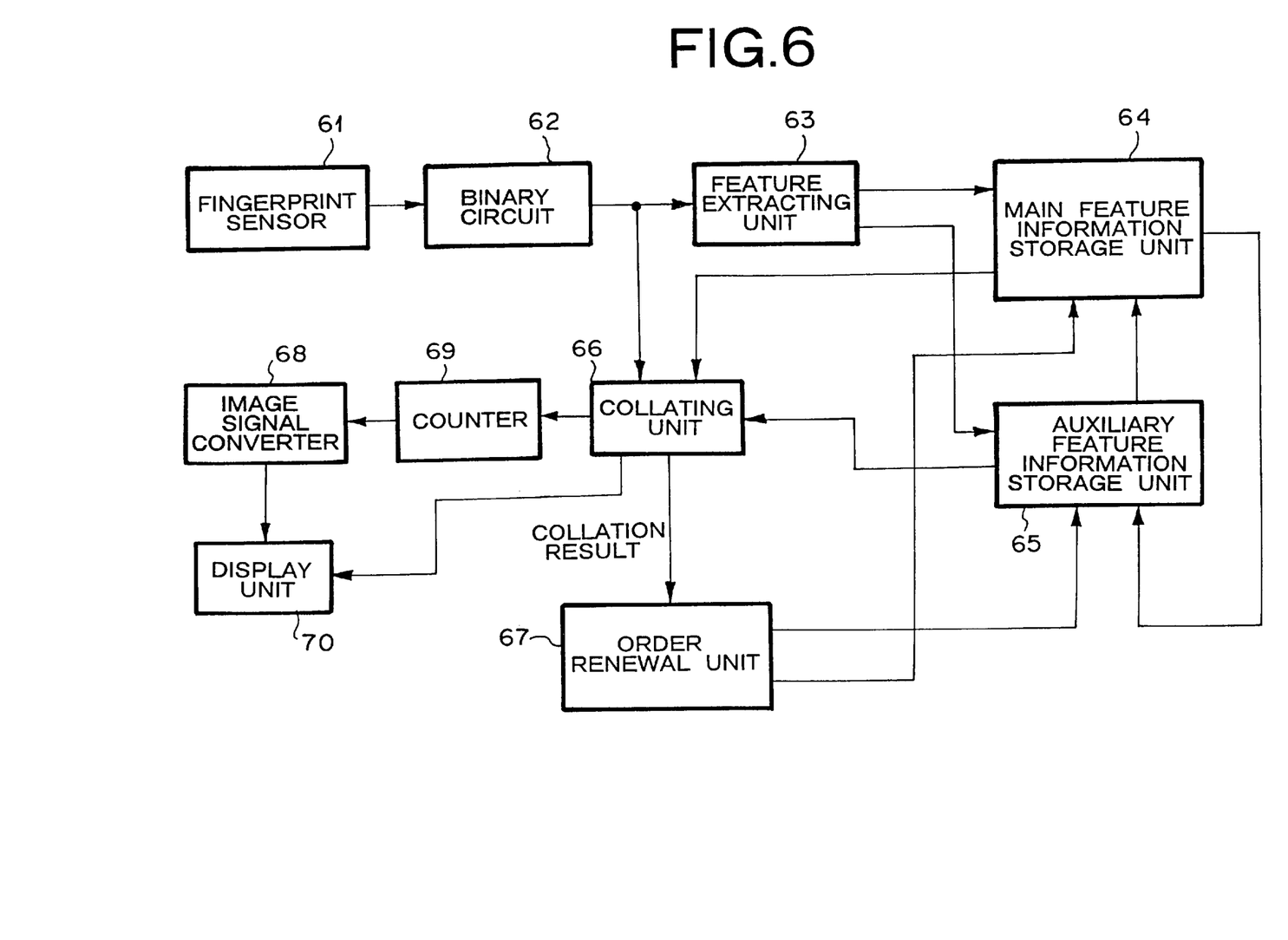
FIG. 6 is a diagram showing the construction of the fingerprint certifying device according to the present invention.

FIG. 6 is a diagram showing the detailed construction for the outlooks of FIGS. 4 and 5. In FIG. 6, the same elements as FIG. 1 are represented by the same reference numerals.

A fingerprint image read out from main feature information-storage unit 64 is collated with a collating fingerprint image input from fingerprint sensor 61 every predetermined window (block) in collating unit 66, and then counter unit 69 counts up the number of points (blocks) in which the fingerprint image read out from the main feature information-storage unit 64 is coincident with the collating fingerprint image input from the fingerprint sensor 61.

Image signal converting unit 68 converts the count value from the counter unit 69 to an image signal and outputs the image signal to a display unit 70. The display unit 70 divides into an effective point number and an residual point number according to the image signal from the image signal converting unit 68 and displays the result as a display index. Further, the result is composed with a fingerprint image signal which is read out from the fingerprint sensor 61 and output from the collating unit 66, and the composed image is displayed. The composite image thus obtained is displayed on the LCD unit 31 shown in FIG. 4. The composite function is equipped to the display unit 70 serving as an indicator for indicating a display index as "10" at maximum, for example. If the display of the fingerprint image signal induces forgery of a fingerprint, the display of the fingerprint image signal is stopped, and only the indication corresponding to the point number representing the coincidence degree may be displayed.

The operations of the other parts, particularly the operations at the registration time and the fingerprint image information stored in the main feature information-storage unit 64 and auxiliary feature information-storage unit 65 are substantially the same as those of FIG. 1.

As described above, FIG. 2 is the flowchart of electrically reading out the fingerprint of a person by using the existing fingerprint certifying devices 30 and 40 (in general, CCD or capacitance type) and judging whether the fingerprint is coincident with fingerprint data which have been registered in advance.

Further, the fingerprint reading units (fingerprint input sensors) 36 and 41 electrically read the fingerprint data of the fingerprint. Thereafter, it is judged whether the fingerprint data thus read out are coincident with the fingerprint data registered in advance (step 12). If there is no coincidence, the re-input of the fingerprint data is awaited. If there is any coincidence, the fingerprint certification is finished (step 13).

Figure 3:
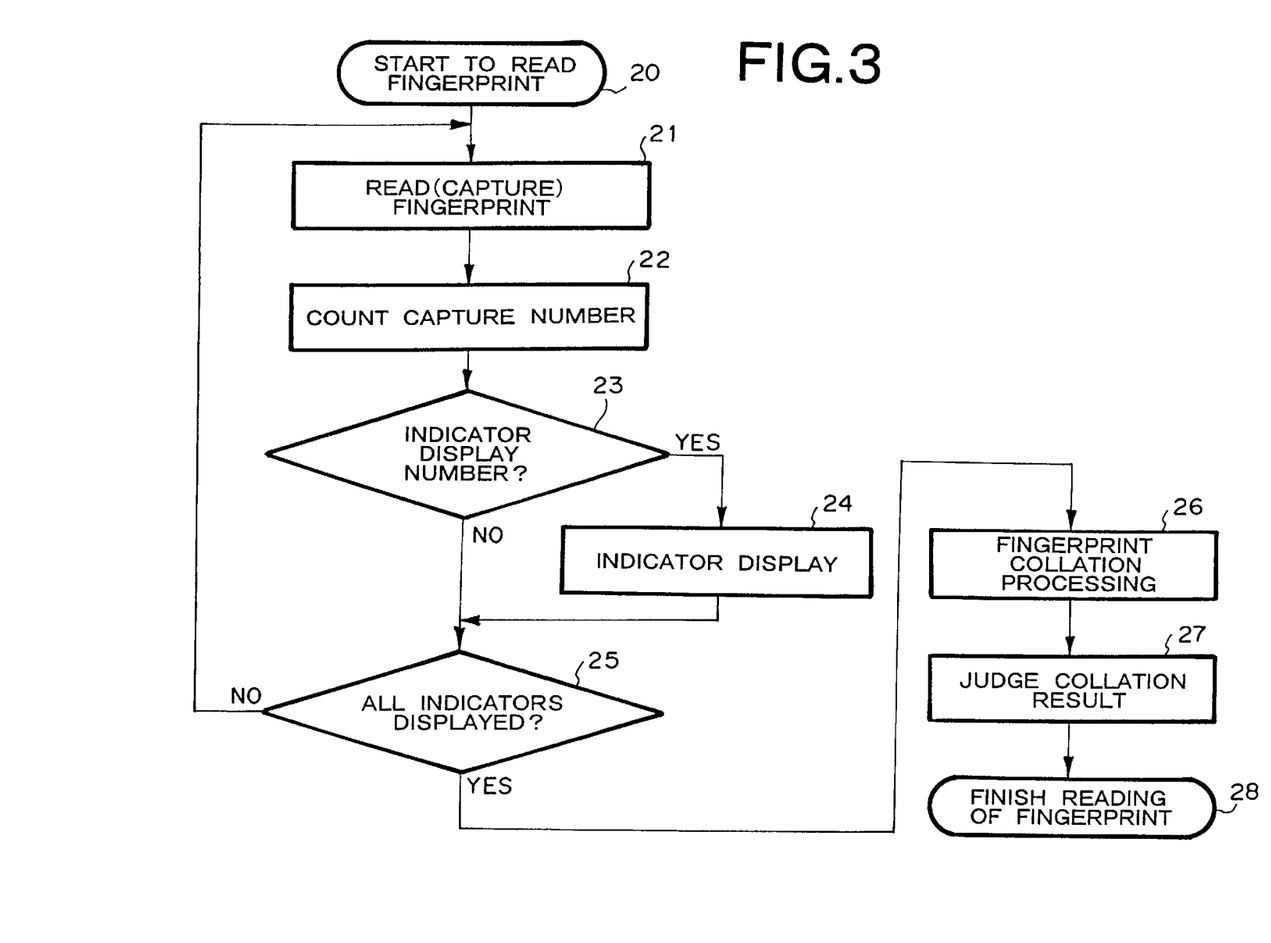
FIG. 3 is another flowchart showing the operation of the fingerprint certifying device according to the present invention.

FIG. 3 is a flowchart showing the details of the fingerprint reading processing 11.

First, the fingerprint reading operation is started by the existing fingerprint certifying device 30 or 40 (step 20). The reading level of the fingerprint data is monitored, and the monitoring of the reading level is continued at all times until the effective point number is reached (step 21). The reading of the fingerprint data is required to be monitored because the time required to reach the point number enabling certification (effective point number) is different among individuals, and thus the counter counts up (step 22) while the monitoring is continued until the effective point number is reached.

FIG. 4 shows an embodiment of the fingerprint certifying device, and it has such a system that fingerprint data 32 (an image of a fingerprint) read in by the fingerprint input sensor 36 are displayed on the color liquid crystal display (LCD) unit 31 and at the same time the certification points are displayed as the indicator 33 in order to visually inform a person being certified of whether the fingerprint data 32 reaches the effective point number. It generally takes several seconds to read out the fingerprint data in the existing fingerprint certifying device.

With an expensive fingerprint certifying system, the fingerprint certification processing can be performed at high speed and the fingerprint reading operation can be completed in an extremely short time by a high-level designed system. However, it is general that a system designed to satisfy a low-price requirement in the market usually has a relatively low processing performance.

The indicator 33 of this embodiment is displayed the effective point number on the LCD 31 integrally installed in the fingerprint certifying device 30. According to this embodiment, when the indicator 33 which is divided into 10 parts every several dots reaches the effective point number, all the parts of the indicator 33 is colored red. At some middle point in the process until the effective point number is reached, the indicator 33 is stepwise color-changed from a black display (the color of the residual pointer 34) to a red display (the color of the effective pointer 35).

FIG. 5 shows another embodiment of the fingerprint certifying device 40, and it is of such a simply type that no LCD unit is provided.

The fingerprint certifying device of FIG. 5 includes fingerprint input sensor unit 41 and LED indicator 42. When a person being certified puts the fingerprint face of his/her finger against the fingerprint input sensor unit 41 to read out the fingerprint, the progress state under the fingerprint input processing is displayed with the number of turn-on LEDs of the LED indicator 42. According to this embodiment, the LED indicator 42 comprises ten LEDs (Light Emitting Diodes). The LED indicator 42 digitally indicates the time in which the effective point number is reached. If the effective point number for the fingerprint certification is low, the number of turn-on LEDs of the LED indicator 42 is reduced. On the other hand, if the effective point number for the fingerprint certification is high, the number of turn-on LEDs of the LED indicator 42 is increased. If the effective point number is reached, all the LEDs of the LED indicator are turned on, thereby informing it to the person being certified that the fingerprint reading operation is completed.

Next, the overall operation of the embodiments of the present invention will be described in detail.

According to an embodiment of the present invention, in FIG. 6, when a fingerprint is registered, a main feature patter of a fingerprint image signal of the fingerprint is registered in the main feature information-storage unit 64 in advance and then a preliminary auxiliary feature pattern is also registered in the auxiliary feature information-storage unit 65 in advance.

Thereafter, when the fingerprint collation is carried out, the collating fingerprint image is read out every line by the fingerprint sensor 61, and converted to digital signals by the binary circuit 62. The digital signals thus converted are successively input to the collating unit 66 to be collated with a registered fingerprint image which seems to be the same as the collating fingerprint image and is output from the main feature information-storage unit 64. Here, the count value is output in the form of points as a window or block from the collating unit 66 while the collation is carried out. The count value output from the collating unit 66 is counted up in the counter unit 69, and converted to an image signal in the image signal converting unit 68 so that an effective point number and an residual point number can be displayed. Thereafter, the display corresponding to the point number is carried out on the display unit 70 serving as the indicator.

Here, the effective point number which is certifiable in the fingerprint certifying devices 30, 40 of FIGS. 4 and 5 is equal to 31,500 pixels in an effective pixel number (90,000 pixels). The indicator 33 (42) displays how many effective points are lack to reach the effective point number of 31,500 pixels. When no finger is put on the fingerprint certifying device 30, 40, the indicator indicates "zero" (all the indicating elements are turned out). When the effective point number exceeds 31,500 pixels, all the indicating elements are turned on. Accordingly, in accordance with the number of indicating of the indicator which are successively turned on, a person who puts his/her finger on the fingerprint input sensor 36, 41 is allowed to recognize and understand how degree his/her fingerprint is read out and how long (how many seconds) it takes to complete the fingerprint certification.

Therefore, there is displayed a visual digital display device "indicator" which informs a person being certified of how degree the effective point has been collected and how long it takes to certify (recognize) the person as the subject, whereby the person being certified can visually recognize how degree the effective point number reaches a point number enough to complete the fingerprint certification.

Next, the display method of the LED indicator 42 will be described with reference to FIGS. 5 and 6.

In FIG. 6, it is assumed that the number of all the pixels of the registered fingerprint image is equal to 90,000 (300× 300) pixels when the collating fingerprint image from the fingerprint sensor 61 is collated with the registered fingerprint image from the main feature information-storage unit 64. When a collation result is displayed on the display unit 70 (for example, the indicator 42), 35% of the 90,000 pixels is assumed as 100% and then allocated to the display values of the display unit 70. On the basis of this assumption, the number of pixels which are coincident in pattern between the collating fingerprint image and the registered fingerprint image is counted up by the counter unit 69. Assuming that the collating result is displayed on the display unit 70 with a numerical expression from 1 to 10 by a comparator (not shown) in the counter unit 69, "100%" corresponds to the numeral "10", and thus 90,000×0.35/10=3,150 pixels corresponds to each count value per numeral (i.e., each incremental value). That is, the numeric value is incremented every 3,150 pixels. In this collating process, if the numeral is incremented, the collation is recognized as being in progress. On the other hand, if the increment of the numeral is disturbed, it may be guessed that the press force of the finger against the fingerprint sensor is weak, and thus the person being certified can press his/her finger against the fingerprint sensor with higher pressure again to thereby promote the fingerprint collation processing.

In the embodiment of FIG. 5, the capture number (data collection amount) per LED of the LED indicator 42 is likewise set to 3,150 pixels, and totally ten indications can be displayed. The LED indicator 42 varies the number of turn-on LEDs in accordance with the number of effective points captured. If the capture number is not more than 3,150 pixels, the indicator 42 indicates "zero" (all the LEDs are turned out). If the capture number exceeds 3,150 pixels, one LED is turned on. If the capture number exceeds 6,300 pixels, two LEDs are turned on. If the capture number exceeds 9,450 pixels, three LEDs are turned on. In the same manner, the number of LEDs to be turned on is increased, and if the capture number exceeds 31,500 pixels, all the LEDs are turned on, thereby informing the person being certified of the fact that the point number reaches the effective point number.

The method of displaying the collating result on the indicator portions on the liquid crystal display (LCD) is basically the same as described above.

According to this embodiment, the indicator portion in LCD unit comprises 10 dots (in longitudinal direction)×100 dots (in the lateral direction), and the indicator portion is controlled with being divided into 10 segments in the lateral direction. If the capture number is not more than 3,150 pixels, all the segments are displayed with black to indicate "zero". If the capture number exceeds 3,150 pixels, a first segment is displayed with red. If the capture number exceeds 6,300 pixels, a second segment is further displayed with red. If the capture number exceeds 9,450 pixels, a third segment is further displayed with red. In the same manner, the number of segments displayed with red is incremented. If the capture number exceeds 31,500 pixels, the overall indicator portion is displayed with red to inform the person being certified of the fact that the effective point number is reached.

In this embodiment, the indicator portion in LCD is divided into 10 segments (10 dots×100 dots in longitudinal and lateral directions). However, "100 dots" may be replaced by "50 dots" or "200 dots", or the number of segments may be varied. Further, in the case of use of the LED indicator, the number of LEDs may be increased or reduced.

In the above-described two embodiments, the number of turned-on LEDs is successively increased or the number of red indications on LCD is increased in accordance with the capture state. The corresponding one or two LEDs or indications may be displayed in accordance with the capture state.

Further, in this embodiments, the number of indication elements of the indicator is incremented in proportion with the increase of the capture number. However, the number of the indication elements of the indicator may be incremented in accordance with the exponential function increase of the capture number.

Still further, in the above-described embodiments, the indicator portion in LCD is designed in a simple quadrangle which is constructed by 10 dots (longitudinally)×100 dots (laterally) and divided into 10 simple quadrangle segments in the lateral direction. On the indicator portion, the color of a part of the quadrangle (or the color of each quadrangle segment) is changed to visually indicate the collation result. However, the shape of the indicator portion of the presents invention is not limited to the quadrangle, and it may be not only preset simple shapes such as a round shape, a rhombus shape and a triangle shape, but also special characters, figures, designed characters, etc.

When the effective point number reaches 31,500 pixels, it may be informed to a person being certified with a beep sound or a voice.

As described above, according to the above embodiments, the following three display modes are described as the display based on the indicator. Namely, the first display mode is the display of the number of indicating elements of the indicator for the overall time for the fingerprint certification/collation. The second display mode is the display of increase of the capturing time for the fingerprint collation. The third display mode is the display for the overall time for the collation with the registered fingerprint image and the certification. The present invention may use any one of the above three display modes or a mixture thereof, and the display mode is not limited to a specific one. As the second display mode, when the fingerprint input sensor is touched for the fingerprint certification, a predetermined number or more of points to be detected is required. In this embodiment, 35% part is set as 100%, and points which are detected as being currently touched are displayed on the indicator. The 90,000 pixels as a dominator means 300×300 pixels, and if at least 35% of 90,000 pixels is not touched by the finger, the collation detection cannot be performed and the fingerprint certification processing is insufficient. The indicator may be displayed so as to be increased or reduced when the finger is moved on the fingerprint input sensor. Further, when the overall time of the first display mode is displayed as the maximum indication, the total time of the second and third display modes may be displayed as 100%. The numerical value of 35% is an example, and thus it may be set to 40% or 50% if the collation precision is required to be further enhanced.

Recent general fingerprint certification processing is completed in about two or three seconds, however, the time for which people must wait to achieve the certification result is felt as being sufficiently long because of human's sense. Accordingly, the fingerprint certifying device of the present invention is also applicable to even a high-speed certification system, and it can be provided as a fingerprint certifying device comfortable to humans.

Second Embodiment

Next, a second embodiment of the system of the present invention will be described.

Figure 7:
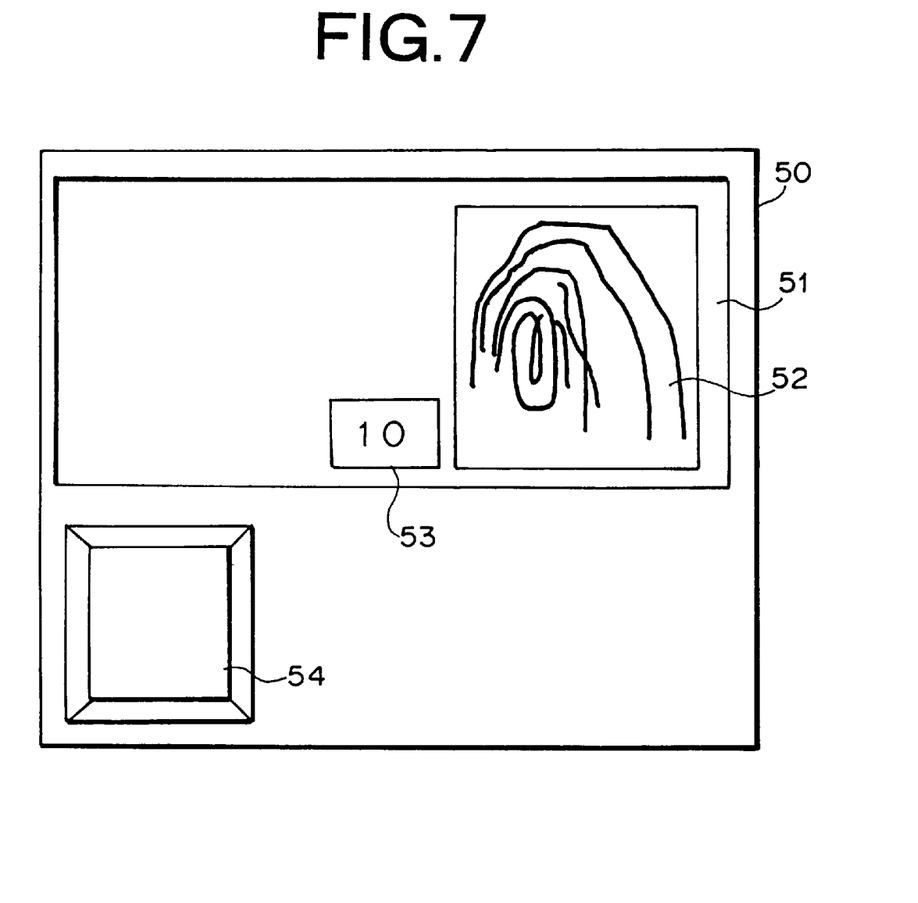
FIG. 7 is a diagram showing the outlook of the fingerprint certifying device according to the present invention.

A fingerprint certifying device 50 of the second embodiment shown in FIG. 7 comprises LCD unit 51 using a thin and light liquid crystal panel, an image 52 of a captured fingerprint being displayed on a part of the LCD unit 51, digital timer 53 for representing the fingerprint certification degree with count-down numerals, and fingerprint input sensor 54 for reading out the pattern of the fingerprint for certification. The count of the effective points for the fingerprint collation may be performed by the construction shown in FIG. 6 or other systems.

According to the second embodiment of the present invention, in the fingerprint certifying device 50 of FIG. 7, the number of certifiable effective points is equal to 31,500 pixels in the effective pixel number of 90,000 pixels as in the case of the first embodiment. However, the indicator comprises a display based on digital numerals (the digital timer 53). The digital timer 53 indicates how degree the effective point number is lack to reach 31,500 pixels. When no finger is put on the fingerprint device, the digital timer 53 indicates "10", and if the effective point number exceeds 31,500 pixels, it indicates "0".

Next, the display method of the digital timer 53 will be described.

The digital timer 53 sets the unit of the capture number (data collection amount) to 3,150 pixels, and counts down the numeral from "10" to "0". The digital timer 53 varies the timer value in accordance with the captured effective point number. If the capture number is not more than 3,150 pixels, it indicates "10". If the capture number exceeds 3,150 pixels, it indicates "9". If the capture number exceeds 6,300 pixels, it indicates "8". If the capture number exceeds 9,450 pixels, it indicates "7". In the same manner, the timer value is counted down and if the capture number exceeds 31,500 pixels, the timer indicates "0" to inform the person being certified of the fact that the effective point number is reached.

In the above embodiment, the timer value counts down from "10" to "0". However, the maximum/minimum value of the count values may be freely set like from "5" to "0". Conversely, the same effect may be obtained by using a method of counting up the timer value from "0" to "10".

The above embodiment is applied to the fingerprint certification processing. However, it may be applied to the fingerprint registration processing. In this case, the point number of a registered fingerprint image to be stored in the main feature information-storage unit 64 is counted up from a predetermined total registration point number, and the registration degree corresponding to the count number is displayed on the display unit.

According to the present invention, it can be visually informed to a person being certified how long it takes to reach the point number (effective point number) enough to certify the person concerned as the subject from the time when the person puts his/her finger on the fingerprint input sensor. The turn-on number or the color of the indicating elements of the indicator enables the person to feel which stage the fingerprint input progresses to, and this information may be digitally informed to the person by using the count-down system or count-up system.

Further, according to the present invention, the person being certified is informed of not only the fact that it has been completed to certify him/her as the subject who has been registered in advance, but also of the fact that the certification processing is in progress.

What is claimed is:

1. A fingerprint certifying device comprising:

a storage unit for storing a registered fingerprint image;

a collating unit for collating a collating fingerprint image inputted to a fingerprint sensor with the registered fingerprint image divided into a predetermined number of blocks;

a counter for counting the number of effective blocks in which the registered fingerprint image of the predetermined number of blocks is coincident with the collating fingerprint image; and a display unit for displaying the value corresponding to a ratio of the count value of the number of effective blocks to a predetermined block number.

2. The fingerprint certifying device as claimed in claim 1, wherein the collating fingerprint image and images of the effective data and residual data corresponding to the counter value are displayed in combination on said display unit.

3. The fingerprint certifying device as claimed in claim 1, wherein when the total effective pixel number of the registered fingerprint image is equal to n and the number of the effective pixels corresponding to the effective block number counted up is equal to m wherein m and n represent positive integers, said display unit displays the ratio of m/n as the effective data and the residual value of 1−(m/n) as the residual data.

4. A method of displaying an effective data capture state when a fingerprint is certified, comprising the steps of:

storing registered fingerprint images in a storage unit;

inputting the pattern of a fingerprint to a fingerprint sensor to read out a collating fingerprint image;

collating the collating fingerprint image with the registered fingerprint image read out from said storage unit;

counting the number of effective blocks in which the registered fingerprint image divided into the predetermined number of blocks is coincident with the collating fingerprint image; and displaying the ratio of m/n as the effective data and the residual value of 1−(m/n) as the residual data, when the total effective pixel number of the registered fingerprint image is equal to n and the number of the effective pixels corresponding to the effective block number counted up is equal to m wherein m and n represent positive integers.

5. A fingerprint certifying device comprising:

a storage unit for reading out a registered fingerprint image as a reference and storing the registered fingerprint image on a pixel basis;

a fingerprint sensor for reading a finger to be certified as a collating fingerprint image;

a collating unit for collating the collating fingerprint image input to said fingerprint sensor with the registered fingerprint image;

a counter for counting up pixels which are collated to be coincident between the registered fingerprint image and the collating fingerprint image in said collating unit; and a display unit for displaying a display index in accordance with the count value of said counter, wherein a predetermined number of pixels to the total pixel number of the registered fingerprint image stored on a pixel basis is set as the maximum value of the display index, and the display index is displayed in accordance with the count value of the pixels which are coincident between the registered fingerprint image and the collating fingerprint image.

6. The fingerprint certifying device as claimed in claim 5, wherein when the total effective pixel number of the registered fingerprint image is equal to n and the number of the effective pixels corresponding to the effective block number counted up is equal to m wherein m and n represent positive integers, said display unit displays the ratio of m/n as the effective data and the residual value of 1−(m/n) as the residual data.

* * * * *